US007266825B2

(12) United States Patent
Lankreijer

(10) Patent No.: US 7,266,825 B2
(45) Date of Patent: Sep. 4, 2007

(54) METHOD FOR SYNCHRONIZING PROGRAM SECTIONS OF A COMPUTER PROGRAM

(75) Inventor: Herman Lankreijer, Hofsingelding (DE)

(73) Assignee: Oce Printing Systems GmbH, Poing (DE)

( * ) Notice: Subject to any disclaimer, the term of this patent is extended or adjusted under 35 U.S.C. 154(b) by 504 days.

(21) Appl. No.: 10/148,376

(22) PCT Filed: Nov. 30, 2000

(86) PCT No.: PCT/EP00/12018

§ 371 (c)(1),
(2), (4) Date: Aug. 21, 2002

(87) PCT Pub. No.: WO01/40931

PCT Pub. Date: Jun. 7, 2001

(65) Prior Publication Data

US 2003/0041086 A1    Feb. 27, 2003

(30) Foreign Application Priority Data

Nov. 30, 1999   (DE) .............................. 199 57 594

(51) Int. Cl.
*G06F 9/46* (2006.01)
(52) U.S. Cl. ...................... 719/312; 718/106; 711/147; 710/210
(58) Field of Classification Search ................ 719/312; 718/1, 100, 107, 104, 106; 709/205, 215; 711/147; 710/200, 210
See application file for complete search history.

(56) References Cited

U.S. PATENT DOCUMENTS 4,769,769 A * 9/1988 Bolt et al. ..................... 710/57

(Continued)

FOREIGN PATENT DOCUMENTS

DE    198 57 332    6/2000

(Continued)

OTHER PUBLICATIONS

Zilker, Praxis des Multitasking, Franzis-Verlag GmbH, Munich, 1987, ISBN 3-7723-8561-3, pp. 45 through 61.

(Continued)

*Primary Examiner*—William Thomson
*Assistant Examiner*—Phuong N. Hoang
(74) *Attorney, Agent, or Firm*—Schiff Hardin LLP

(57) ABSTRACT

The invention relates to a method for synchronizing program sections of a computer program. The program sections can run in parallel on different processors of a computer. Data transfer between the program sections is synchronized by providing a buffer. Unauthorized access to the buffer is prevented by means of a flag that is set automatically by buffer utilities. The data transfer between individual program sections is thus synchronized by the buffer synchronization class only, which consists of the buffer, internal variables and the buffer utilities, is configured in a very simple manner and can thus be tested in operation an in a relatively simple manner by means of a computer comprising several processors. The data transfer is very efficient as the individual utilities are designed in a simple and short manner and thus require little processing time and as the data can be directly written in or read out of the buffer.

24 Claims, 10 Drawing Sheets

U.S. PATENT DOCUMENTS

| | | | | |
|---|---|---|---|---|
| 4,782,442 A | * | 11/1988 | Kojima et al. | 709/220 |
| 5,293,613 A | * | 3/1994 | Hayden et al. | 714/15 |
| 5,307,495 A | | 4/1994 | Seino et al. | |
| 5,410,654 A | * | 4/1995 | Foster et al. | 711/147 |
| 5,463,625 A | | 10/1995 | Yasrebi | |
| 5,710,923 A | | 1/1998 | Jennings et al. | |
| 5,758,149 A | * | 5/1998 | Bierma et al. | 707/8 |
| 5,928,351 A | | 7/1999 | Horie et al. | |
| 6,188,699 B1 | * | 2/2001 | Lang et al. | 370/463 |
| 6,289,334 B1 | * | 9/2001 | Reiner et al. | 707/3 |
| 6,385,658 B2 | * | 5/2002 | Harter et al. | 719/312 |

FOREIGN PATENT DOCUMENTS

| | | |
|---|---|---|
| GB | 1 491 453 | 11/1977 |
| WO | WO97/25672 | 7/1997 |
| WO | WO99/17198 | 4/1999 |

OTHER PUBLICATIONS

Vom Echzeitkern zum kompletten Betriebssystem, *Design & Elektronik*, vol. 26, Dec. 22, 1989, pp. 44-47 w/ translation of abstract.

Tanenbaum, Andrew, Moderne Betriebssystems, Carl Hanser Verlag Munich Vienna, 1994, ISBN 3-446-17472-9, pp. 40 through 54.

Chiola et al, "Implementing a low cost, low latency parallel platform", *Parallel Computing*, (1997), pp. 1703-1717.

Liu et al, "Worker-checker—A Framework for run-time parallelization on multiprocessors", *Journal of Systems Architecture*, 45, (1998), pp. 205-229.

Rauchwerger, "Run-time parallelization: Its time has com", *Parallel Computing*, 24, (1998), pp. 527-556.

Berkovich et al, "A combinatorial architecture for instruction-level parallelism", *Microprocessors and Microsystems*, 22 (1998), pp. 23-31.

Cohen & Woodring, "Win 32 Multithreaded Programming", ISBN 1-56592-296-4, Chapter 9, Advanced Encapsulation Techniques, pp. 300-303 and 258-269, Dec. 1999.

* cited by examiner

METHOD FOR SYNCHRONIZING PROGRAM SECTIONS OF A COMPUTER PROGRAM

BACKGROUND OF THE INVENTION

1. Field of the Invention

The invention is directed to a method for synchronizing program sections of a computer program whose program sections can run in parallel on different processors of a computer.

2. Description of the Related Art

The programming and synchronization of threads is explained in "Win 32 Multithreaded Programming", Aaron Cohen and Mike Woodring, O'Reilly & Associates Inc., ISBN 1-56592-296-4, particularly on pages 258 through 269 and 301 through 303. Such threads are also referred to as "program sections" below.

Program sections that generate data for another program section are referred to as "producers" or "writers", and program sections that process such data are referred to as "users" or "readers". It is necessary that the individual program sections work asynchronously in order to optimally utilize the computing power of a computer having a plurality of processors in the division of the work between the individual program sections. This means that the producer program section can generate as many data as it wishes, and the reader program section can read as many data as are available without having to take the other program section into consideration. The data of a producer program section are packed in packets (messages) by this program section and are entered into a queue from which the reader program section can take and further-process the packets.

The individual program sections are provided with functions that wait until they can put a corresponding packet in a queue or until a corresponding packet has arrived to be read which assures the correct allocation of the data to the functions that process them and assures that the transport of the data is synchronized.

The synchronization of the data transfer between individual program sections can be implemented internally or externally. "Internal synchronization" means a synchronization in which the individual synchronization events are implemented by the program sections. In contrast, "external synchronization" is implemented using programs formed outside of the program sections. An external synchronization is preferably employed for data structures that are simultaneously used by different program sections. For the data transfer between individual program sections, it is standard to internally synchronize them. It is assumed that an internal synchronization is easier to realize here and the corresponding programs are shorter.

One goal of such synchronization mechanisms is that they can be utilized in an optimally versatile way, i.e., that they can be employed by the greatest variety of program sections. The queues mentioned above are an example of communication mechanisms that can be employed in a very versatile way. However, they generate a considerable administration outlay, since the data must be packed in corresponding packets, these packets must be provided with corresponding information, must be correspondingly sent by the producer program sections, must be accepted by the queue and must be in turn taken by the reader program section, read out and compiled. This general employability of the queues is obtained at the expense of a high administration outlay.

Program sections run fastest on different processors when they are programmed with an asynchronous data transfer. Given such an asynchronous data transfer, for example, a program section can output a query for data and subsequently undertake a different processing of data while it waits to receive the requested data. Such an asynchronous data transfer is highly efficient but very hard to program.

One problem of these computer programs distributed onto a plurality of program sections is that a test in which the program sections run simultaneously on a plurality of processors is difficult to implement since different errors can occur depending on how the processing of the individual program sections overlap in terms of time. This can result in, e.g., a one-in-a-thousand chance of an unpredictable error occurring, even thought the computer program functions correctly every other time. For a dependable test in practice, it is necessary that such synchronization methods be tested with a multi-CPU computer as a prerequisite. Such computers comprise a plurality of processors that can simultaneously process different program sections.

A method for synchronization program sections must therefore not only utilize an efficient data transfer and be versatile, but must also be fashioned as simply as possible so that no unreasonably great engagement is needed when testing the computer program.

Tanenbaum, Andrew, Moderne Betriebssystems, Carl Hanser Verlag Munich Vienna, 1994, ISBN 3-446-17472-9, pages 40 through 54, discloses various methods for solving multi-tasking jobs in operating systems. Chapter 2.5 describes "semaphores" with which the shared employment of buffer memory sections by write program sections and read program sections can be controlled. The control thereby ensues in program sections that respectively have a prescribed buffer section size.

The employment of ring buffers is explained in Zilker, Praxis des Multitasking, Franzis-Verlag GmbH, Munich, 1987, ISBN 3-7723-8561-3, pages 45 through 61. Such ring buffers are also characterized by a permanently prescribed size of the pre-sections. This publication also describes the employment of queues (messages), in which the respective buffer sections also have a fixed length.

German patent document DE-C1-198 57 332 discloses a method for synchronizing processes in which an indicator is allocated to a semaphore, a participating program section being capable of indicating a change of the semaphore with this indicator.

SUMMARY OF THE INVENTION

The invention is based on the object of providing a method for synchronizing program sections of a computer program that can be employed in a versatile manner, allows a very efficient data transfer between the program sections, and is also fashioned in a simple way.

In the inventive method, program sections of a computer program are synchronized. The computer program is constructed such that the program sections can run parallel on different processors of a computer. Producer program sections that generate data for a different program section respectively write these data into a buffer. Read program sections that read data from a different program section read the data out from a buffer. Buffer sections of the buffer are provided with a respective buffer section flag that prevents a prohibited writing and reading of the corresponding buffer sections in which the buffer section flag is independently set by buffer service programs.

The inventive method for the synchronization of program sections provides, in particular, a buffer in which the reading and writing is controlled using a buffer flag or a standard function (such as a semaphore) as well as using one or more buffer section flags. The access of buffer service programs onto the buffer overall is controlled with the standard function or with the buffer flag. This control ensues to prevent, during the access of a first buffer service program onto the buffer, a simultaneous access onto the buffer by a second buffer service program. The access of read program sections and producer program sections onto buffer sections is controlled with the program sections flags that are set by the buffer service programs.

The inventive program structure is fashioned in a very simple way, and thus it can also be tested with relatively little outlay on computers with a plurality of processors. The inventive method is very efficient, since the data can be directly written into the buffer by a producer program section or can be directly read from it by a read program section. A pre-processing or post-processing of the data that are written or read is not necessary. The inventive method is also very efficient since the setting or deletion of the buffer flag or buffer section flag produces only a slight administration outlay so that the processor capacity of a computer is concentrated on the essential jobs of data transfer or the execution of the program sections.

According to a preferred embodiment of the invention, the individual buffer sections are arranged lying immediately behind one another in the memory area of the computer, and administrative data such as the flag, the size of the buffer section, or the data type allocated to the respective buffer sections are stored in as memory area that is independent therefrom. This creates a continuous memory area occupied with data, and this can be quickly and simply read out or written with new data. Moreover, this fashioning of the buffer allows that this data can be written with blocks of a specific size and blocks of a different size can be read. As a result, the data transfer rate, which is influenced by the size of the blocks, can be correspondingly adapted to the corresponding demands that may be high or low both at the side of the producer program sections as well as at the side of the read program sections.

An inventive control module (synchronization buffer class) for buffer memory administration can be programmed and/or offered as a turnkey module with which, on the one hand, large quantities of data can be exchanged between various threads and that, on the other hand, allows very flexible read and write operations. A buffer memory in which data are exchanged between the threads is administered such that a buffer write thread can define the size of the buffer section it needs, whereas a buffer read thread can read data across a plurality of buffer sections.

DESCRIPTION OF THE DRAWINGS

The invention is explained in greater detail below by way of example and on the basis of the accompanying drawings.

Figure 6:
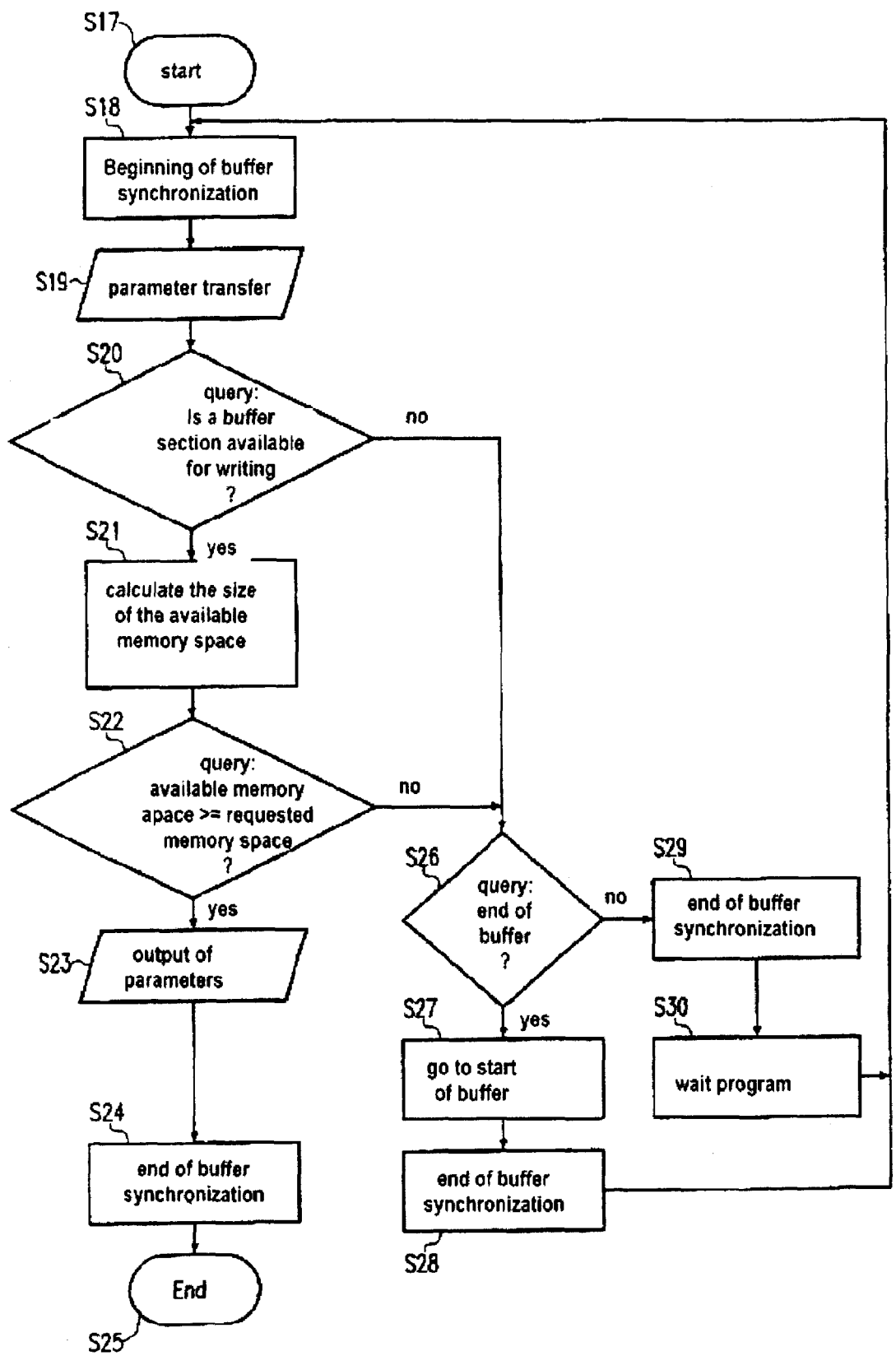
Figure 7:
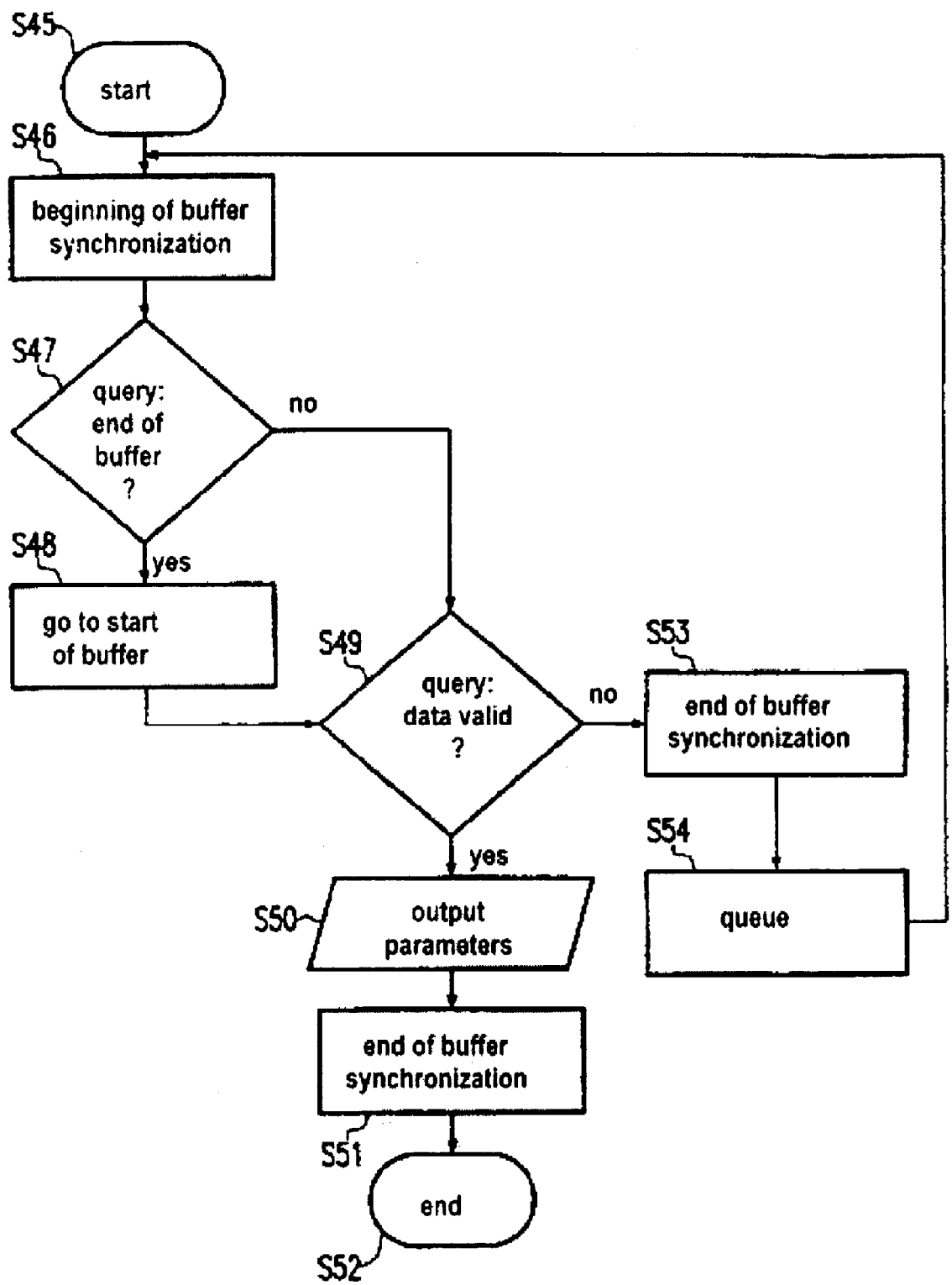
Figure 8:
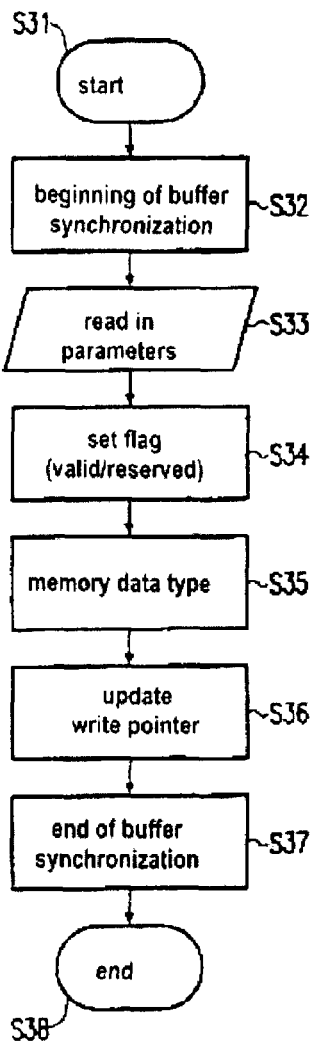
Figure 9:
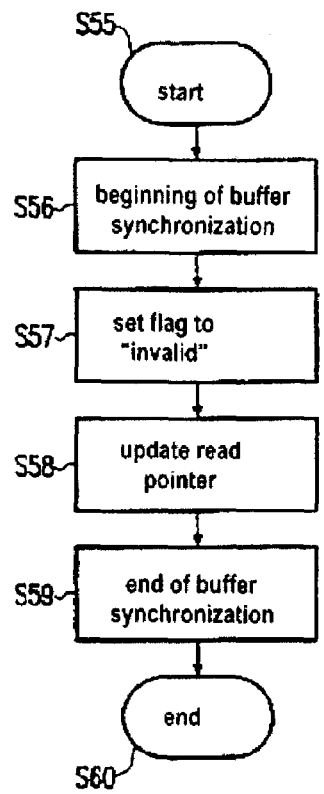
Figure 10:
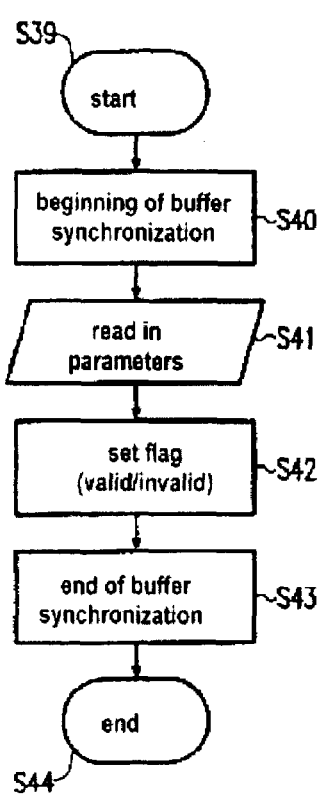
Figure 11A:
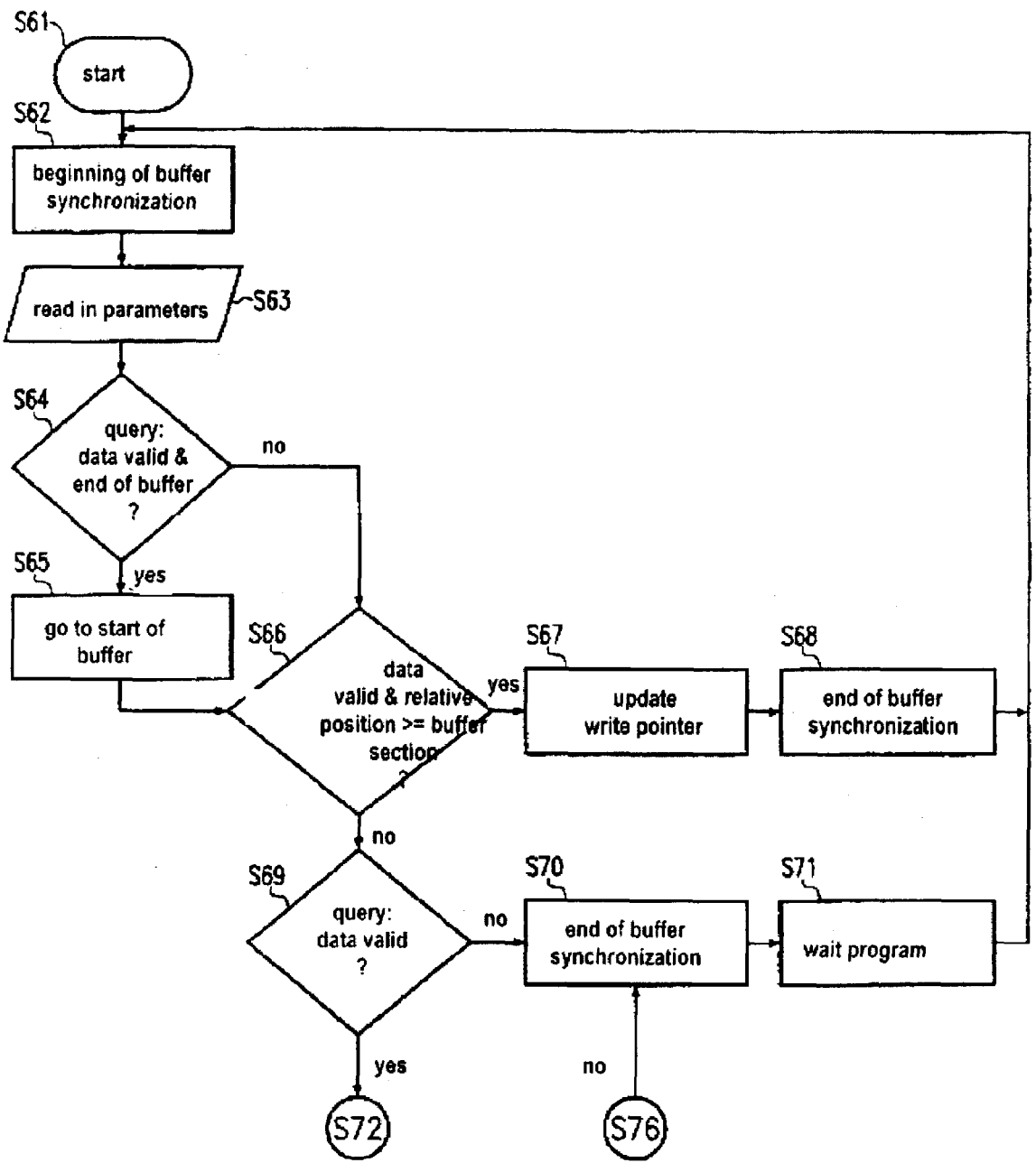
Figure 12:
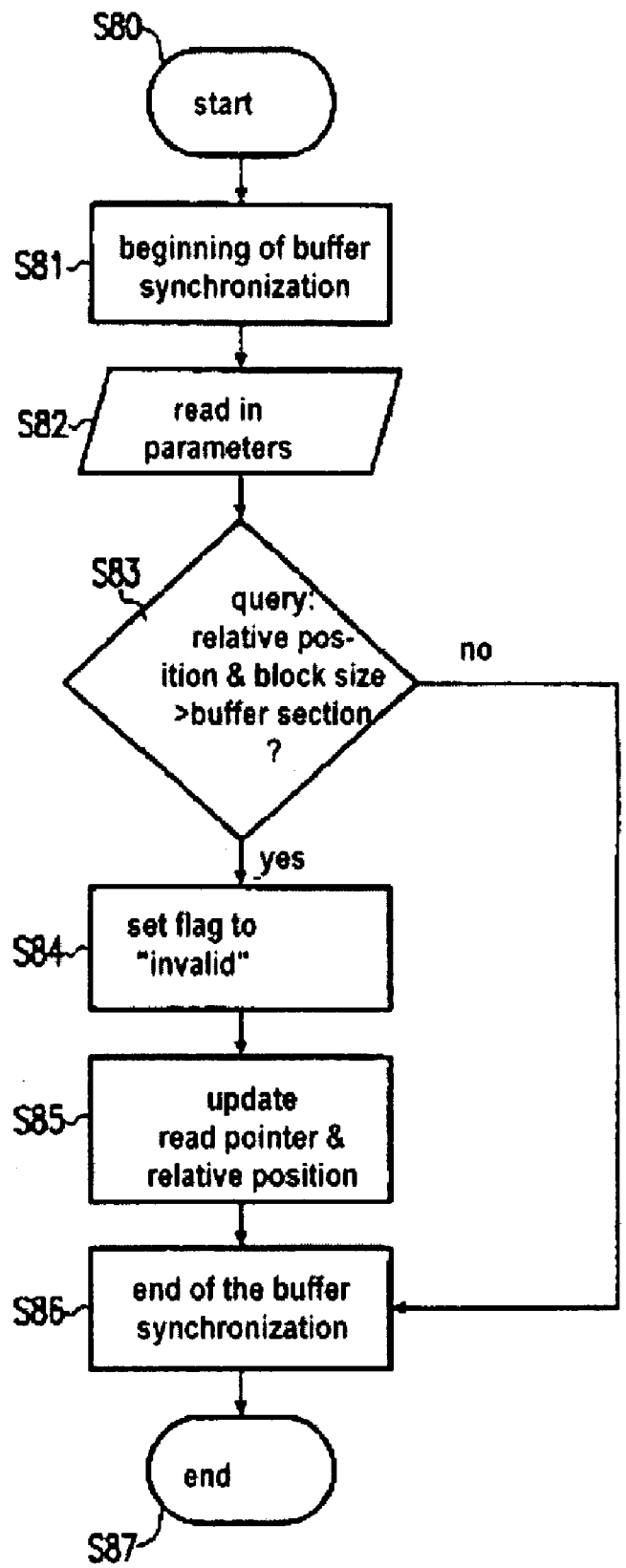
Figure 13:
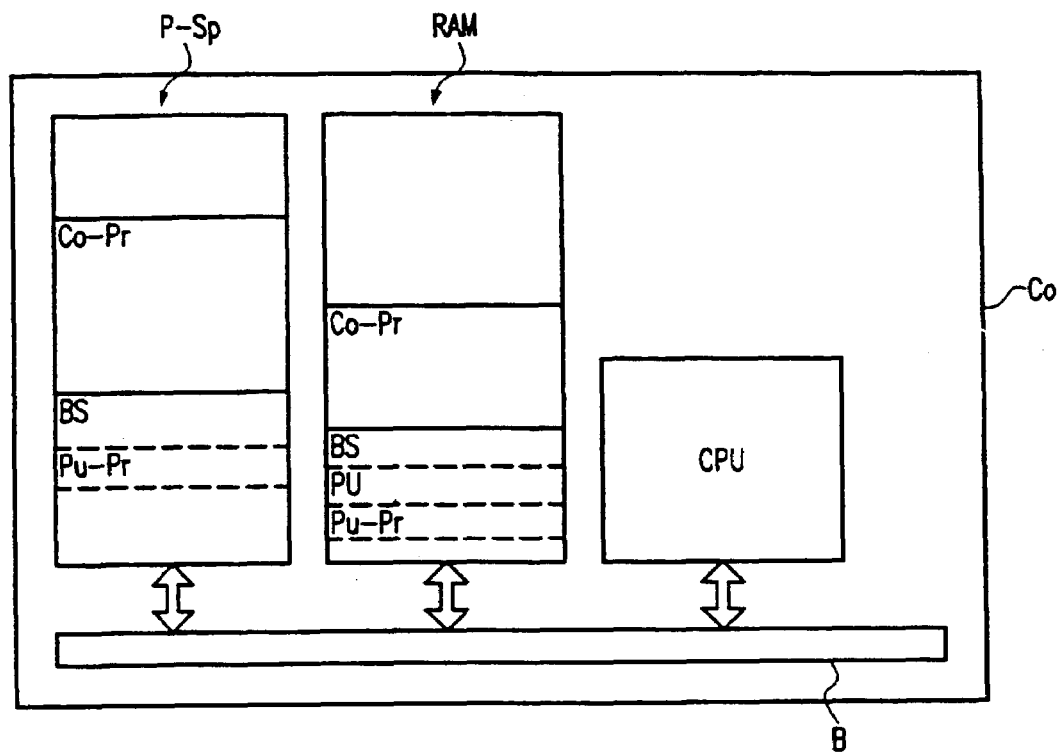
Figure 14:
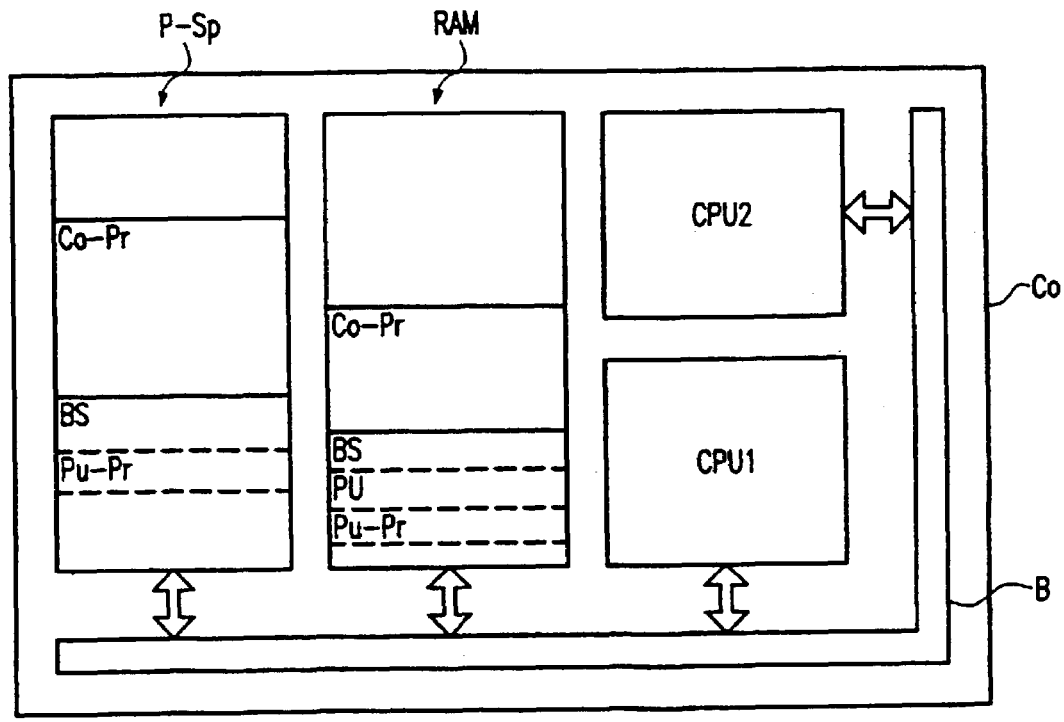

1) the region of the producer program section, 2) the synchronization buffer class, and 3) the region of the read program section, and the flowchart blocks are respectively arranged in the region in which they are executed;

FIGS. 6 through 10 are flowcharts of the individual buffer service programs according to a first exemplary embodiment;

FIG. 6 is a flowchart of the buffer service program GetToBufPntr according to a first exemplary embodiment;

FIG. 7 is a flowchart of the buffer service program GetFromBufPntr according to a first exemplary embodiment;

FIG. 8 is a flowchart of the buffer service program ReleaseToBufPntr according to a first exemplary embodiment;

FIG. 9 is a flowchart of the buffer service program ReleaseFromBufPntr according to a first exemplary embodiment;

FIG. 10 is a flowchart of the buffer service program SetResBufState;

FIGS. 11a, b are flowcharts of the buffer service program GetFromBufPntr according to a second exemplary embodiment of the invention that is modified compared to the first exemplary embodiment;

FIG. 12 is a flowchart of the buffer service program ReleaseFromBufPntr according to a second exemplary embodiment of the invention that is modified compared to the first exemplary embodiment;

FIG. 13 is a simplified schematic block diagram showing a computer with a processor; and FIG. 14 is a simplified schematic block diagram showing a computer with two processors.

DETAILED DESCRIPTION OF THE INVENTION

Figure 1:
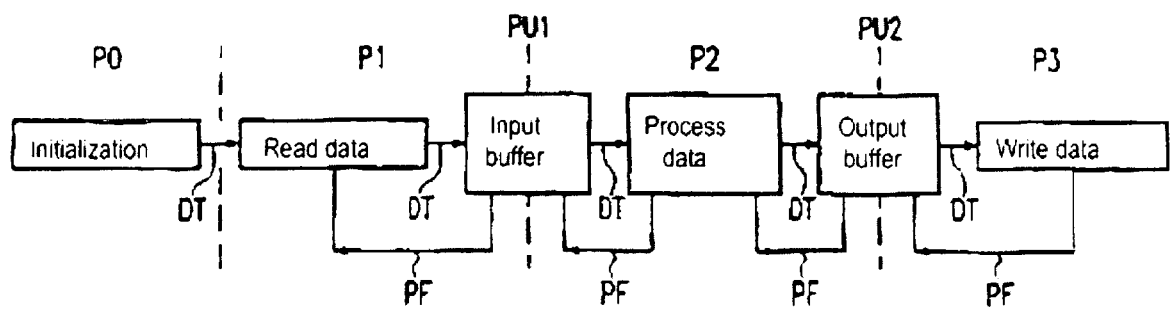
FIG. 1 is a schematic block circuit diagram showing the operation of a computer program split into a plurality of program sections according to the inventive method.

FIG. 1 schematically shows the operation of a computer program divided into a plurality of program sections P0 through P3. For illustration, only a simple computer program is schematically shown, its program sections implementing the initialization P0, the data reading P1, the data processing P2 and the data writing P3. The program section "read data" P1 must hand over data to the data section "process data" P2 and the latter must hand over data to the program section "write data" P3, for which reason a buffer PU1 is arranged between the program sections P1 and P2 and a buffer PU2 is arranged between the program sections P2 and P3.

From the point of view of the program section "process data" P2, the buffer PU1 is an input buffer that inputs data into the program section P2, and the buffer PU2 is an output buffer that accepts data of the program section P2. With the inventive method, the data transfer DT from a program section to a buffer—for example from P1 to PU1 or from P2 to PU2—or from a buffer to a program section—for example from PU1 to P2—is controlled merely by a communication between the respective buffer and the respective program section. This is shown in FIG. 1 by the arrows PF proceeding opposite to the main data stream.

The basic principles of the inventive control of the data transfer DT between the program sections and the buffers is explained in greater detail below on the basis of FIGS. 3 through 5.

This control or synchronization of the data transfer DT ensues with a synchronization buffer class. The term "class" has been coined in object-oriented programming and means a closed unit in the sense of the present patent application that comprises data stored in fields and variables as well as programs. The synchronization buffer class comprises a memory area in which one or more buffer sections are stored, a further memory area, the control field in which administrative data for the buffer are stored, and buffer service programs. The buffer service programs are functions, i.e., executable program parts.

In the inventive method, a respective group of administrative data are allocated to each buffer section, these comprising a flag (FIG. 3), an element related to the size of the buffer section, and an element related to the content of the data stored in the buffer. The flag is a status variable that can assume three states, namely "invalid", "valid" and "reserved". When the flag is "invalid", then this means that no data provided for reading by the producer program section are contained in the appertaining buffer section. When the flag is "valid", data have been written into the appertaining buffer section that can be read by the read program section. When the flag is "reserved", then this means that the producer program section has already written data into the appertaining buffer section but these data are not yet enabled for reading by the read program section. The flag must be set to "valid" for this purpose.

The synchronization buffer class further comprises some buffer service programs such as the following exemplary programs:

GetToBufPntr (FIG. 6);
ReleaseToBufPntr (FIG. 8);
GetFromBufPbtr (FIGS. 7, 11); and
ReleaseFromBufPntr (FIGS. 9, 12).

Figures 3, 4:
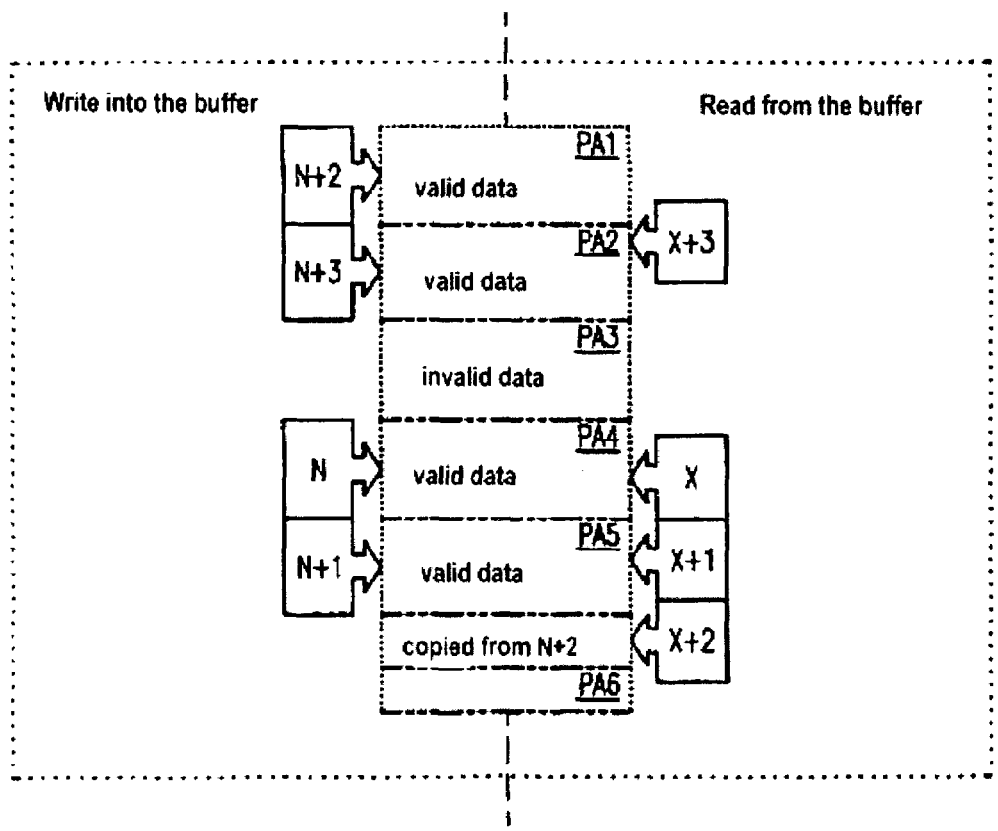
FIG. 3 is a table showing an example of a buffer with flags allocated to the respective buffer sections in a tabular presentation.
FIG. 4 is a block diagram showing writing into the buffer and reading from the buffer with different blocks.

FIG. 3 shows the flags and buffer sections of an inventive synchronization buffer class schematically in a table. At least 8 buffer sections are provided to which a respective flag is allocated. The buffer section 0 (uppermost buffer section in FIG. 3) contains no data provided for reading, for which reason the appertaining flag has the value "invalid" assigned to it. The further buffer sections 1 through 5 contain data, where the buffer section 1 through 3 can be read and the buffer sections 4 through 5 have not yet been enabled by the producer program section. Accordingly, the value "valid" is assigned to the flags allocated to the buffer sections 1 through 3, and the value "reserved" is assigned to the flags allocated to the buffer sections 4 and 5. The further buffer sections 6 and 7 contain no data enabled for reading, for which reason the flags allocated to them comprise the value "invalid". A producer program section can write data into the buffer sections 6, 7 and 0, and a read program section can read data from the buffer sections 1 through 3.

Figure 5:
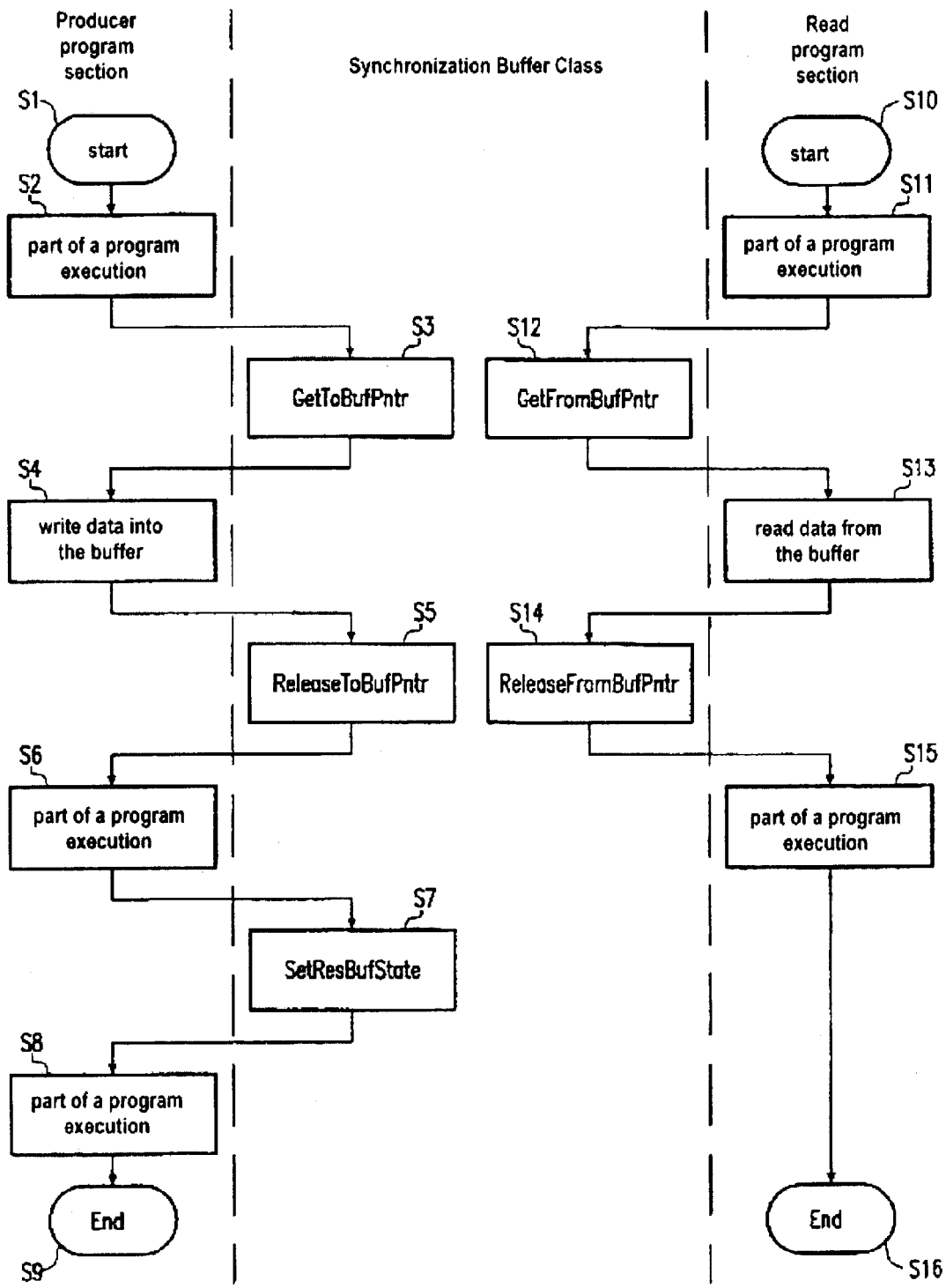
FIG. 5 is a simplified flowchart illustrating the writing and reading, the flowchart being subdivided into three regions.

FIG. 5 schematically shows the collaboration of a producer program section and a read program section that receives data from the producer program section intermediately stored in an inventive synchronization buffer class. The producer program section starts with a step S1. With a step S2, FIG. 5 schematically shows the execution of a predetermined region of the program section with which data are generated for the read program section. In step S3, the buffer service program GetToBufPntr is called, this being a constituent part of the synchronization buffer class. With the call of this buffer service program, a query is made as to whether a buffer section of the size M1 is free in the buffer for writing data. The buffer service program GetToBufPntr (M1) executes this query and potentially waits until the corresponding memory area is free. As soon as the desired memory area is available, this buffer service program hands over a write pointer and the parameter M2, which indicates the size of the available memory area to the producer program section. M2 is at least as large as M1. The write pointer contains the address of the start of the available memory area.

With the start address of the available memory area and the maximally available memory area, the producer program section can write data directly into the available memory area in step S4.

When all data have been written into the memory area, this memory area represents a buffer section, and the buffer service program ReleaseToBufPntr is called in step S5, the flag of the written buffer section being set to either "valid" or "reserved" depending on whether the data have been enabled for reading by the read program section or not.

Steps S6 through S7 symbolically show further processing events of the producer program section. With the intervening step S7, the buffer service program SetResBufState (<flag type>) is called with which the buffer section written in step S5, but not yet enabled, is either enabled for reading in that the corresponding flag is set from "reserved" to "valid" or is "deleted" for the read program section in that the corresponding flag is set from "reserved" to "invalid", permitting this memory area to be written again by the producer program section. The program execution of the producer program section ends with the step S9.

The program execution of the read program section is shown at the right side in FIG. 5 and begins with the step S10. The illustration in FIG. 5 is purely schematic and does not reflect the correct time sequence. Step S11 shows a section of the program run requiring the producer program section. The read program section therefore calls the buffer service program GetFromBufPntr S12. This buffer service program queries whether a buffer section in the buffer is written with data that are enabled for reading by the read program section. When no data are enabled, this buffer service program waits until a corresponding plurality of data have been written and enabled. Subsequently, a read pointer and the size of the buffer section that is written with data enabled for reading are output to the read program section. The read pointer contains the address of the start of the buffer section enabled for reading.

The read program section can read the data directly from the buffer in step S13 on the basis of this read pointer and the size of the buffer section enabled for reading.

When the read operation has ended, then the read program section calls the buffer service program ReleaseFromBufPntr S4 with which the buffer section read out by the read program section is re-enabled for writing, i.e., that the corresponding flag is set from "valid" to "invalid".

The rest of the program run executed by the read program section is schematically shown with S15. The program run of the read program section ends with the step S16.

The individual buffer service programs are explained in greater detail below on the basis of FIGS. 6 through 12.

GETTOBUFPNTR (FIG. 6)

FIG. 6 shows the buffer service program GetToBufPntr (M1) as a flowchart. It begins with the step S17 which is followed by the beginning of the buffer synchronization S18 in the program run. In step S18, a standard function of the operating system employed is called which prevents a simultaneous access to the buffer and the appertaining internal variables of the synchronization buffer class by another buffer service program. In the operating system Windows NT, this standard function can, for example, be realized as a semaphore or as a mutex. These object types (semaphore and mutex) are described, for example, in the help manual of the programming environment of Microsoft Visual C++, Version 6.0 for Win32-API—Win NT Applications Programming Interface, as well as in the initially cited book, "Win 32 Multithreaded Programming", Aaron Cohen and Mike Woodring, O'Reilly & Associates Inc., pages 23-25, 81-86 (mutual exclusion) as well as 27-28 and 87-92 (semaphores). These publications are herewith incorporated by reference into the present specification. The access to the entire buffer is thus controlled by a corresponding buffer flag having two statuses/states: "FREE" and "BLOCKED". Semaphores and mutex objects thereby control the access and potential waiting events largely automatically.

A first status (ENABLE) of a corresponding buffer flag enables an access for a querying buffer service program. A second status (WAIT) blocks such an access because a first buffer service program already has a current access authorization. An access authorization granted to the querying buffer service program only when a buffer flag (or a corresponding object such as a semaphore or a mutex) has an enable status.

In step S19, the parameter M1 handed over by the producer program section is read in, this indicating the memory space that is required for writing. In step S20 a query is made as to whether a buffer section for the writing is available in the buffer. When the result of the query in step S20 is that is buffer section is fundamentally free for writing, then the program run switches to the step S21 with which the size of the free memory space in the writable buffer section is calculated.

A query is made in step S22 as to whether the calculated free memory space M2 is larger than or equal to the queried memory space M1.

When the outcome of this query in step S22 is that adequate free memory space is available, then the first address of the buffer section—in the form of a write pointer—as well as the identified size of free memory space M2 are output to the producer program section in step S23. Subsequently, the producer program section can write the data into the buffer section.

The buffer synchronization is ended in step S24, permitting other buffer service programs to again access the buffer and the internal variables of the synchronization buffer class. The buffer service program GetToBufPntr is ended with the step S25.

When the query in step S20 shows that no buffer section is basically free for writing or when the query in step S22 shows that the available free memory space is less than the required memory space, then the program run switches to the step S26 in which a query is made as to whether the write pointer, i.e., the first address of the buffer section to be written, plus the queried memory space M1 has reached or exceeded the physical end of the buffer.

When the physical end has been reached, the program run switches to the step S27 in which the write pointer to the physical start of the buffer is stored, i.e., the first address of the buffer as physical start. In the following step S28, the buffer synchronization is ended and the program run switches back to the step S18, which restarts the buffer service program GetToBufPntr.

When the query in step S26 shows that the sum of the address of the write pointer and the queried memory space M1 does not point to the physical end of the buffer or beyond it, then the program run switches to the step S29 with which the buffer synchronization is ended, since it was already found in step S20 or S22 that adequate memory space is not available. A wait program is run in step S30 that waits for predetermined events of the further buffer service program and arrests the program run of the buffer service program GetToBufPntr for this length of time. The wait program can employ auxiliary operating system programs or objects such as semaphores. In the present case, the wait program waits until the buffer service program ReleaseToBufPntr again releases a buffer section. While waiting, the buffer service program GetToBufPntr is put to sleep (arrested). The buffer service program ReleaseToBufPntr generates a signal (event) that reawakens (continues) the buffer service program GetToBufPntr. The calculating performance of the CPU is thus not made use of during the wait.

Since the buffer synchronization has ended in the step S29, a different program section, particularly the read program section, can access the buffer and the internal variables of the synchronization buffer class during the wait program and can read out data stored in the buffer. This permits writable memory space to be created in the buffer. At the end of the wait program, the program run returns to the step S18 with which the buffer service program GetToBufPntr restarts. The program run is identical to the above-described program run.

The producer program section is informed of the write pointer and of the amount of memory space available for writing with the service program GetToBufPntr. This can then write the data directly into this memory area (S4).

RELEASETOBUFPNTR (FIG. 8)

The write operation is ended (FIG. 8) with the buffer service program ReleaseToBufPntr (M3, <datatype>, <flagtype>). This buffer service program begins with the step S31 and starts the buffer synchronization in step S32. This step corresponds to the step S18 of the buffer service program GetToBufPntr (FIG. 6). In step S33, the parameters supplied by the producer program section (for instance the described memory space M3, data type, flag type) are read in. In step S34, the flag of the buffer section is set to "valid" or "reserved" according to the parameters that are read in. Subsequently, the data type is stored in the control field in step S35. Typical data types are, for example, "data", "end of buffer", "end of file" or the like.

The write pointer is updated in step S36 in that the value of the described memory space is added to the previous write pointer. This address stored in the write pointer is now the first free address after the written buffer section.

In step S37, the buffer synchronization is ended and the buffer service program ReleaseToBufPntr is subsequently ended in step S38.

Thus, with the buffer service program ReleaseToBufPntr, the above-described buffer section is either enabled for reading by the read program section or initially reserved by setting the flag to "valid" or "reserved" in order to then determine later whether the data are enabled for reading or discarded.

With the buffer service program SetResBufState, one or more reserved buffer sections can be enabled for reading or discarded (FIG. 10). With steps S39 and S40, the buffer service program SetResBufState is started and the buffer synchronization is begun. With the step S41, the producer program section accepts the flag value "valid" or "invalid". Subsequently, in step S42, the buffer section or buffer sections marked with the flag "reserved" are marked with the flag value taken in step S41, so that the data stored within are either enabled for reading (flag: valid) or discarded (flag: invalid). With steps S43 and S44, the buffer synchronization is ended and the buffer service program SetResBufState is ended.

With the three above-explained buffer service programs GetToBufPntr, ReleaseToBufPntr, SetResBufState, a producer program section can write the data it generates into the synchronization buffer class and enable them for reading by a read program section.

GETFROMBUFPNTR—FIRST EMBODIMENT (FIG. 7)

The reading of data begins with the read program section by calling the buffer service program GetFromBufPntr (FIG. 7).

The service program GetFromBufPntr begins with the step S45 and starts the buffer synchronization in step S46 so that no other program section can access the buffer and the internal variables of the synchronization buffer class.

A check is carried out with step S47 to see whether the read pointer points to the end of the physical buffer. A buffer section without data to which an "end of buffer" is allocated as the data type always resides at the end of the physical buffer. This means that the query in step S47 merely queries whether the buffer section to which the read pointer points contains the data type "end of buffer". When this is the case, then the program run switches to the start of the buffer, i.e., the read pointer is set S48 to the first address of the buffer and, thus, to the first buffer section. Subsequently, the program run switches to the step S49. When the query from S47 indicates that the read pointer does not point to the end of the buffer, then the program run switches directly to the step S49.

A query is made in step S49 as to whether the flag of the buffer section to which the read pointer points has the value "valid". When this is the case, this means that the data stored in this buffer section are enabled for reading. In this case, the program run switches to the step S50 with which the read pointer, the size of the buffer section and the data type are handed over to the read program section. This ensues by way of writing the corresponding values into three variables that, when called by GetFromBufPntr, are handed over from the read program section to the synchronization buffer class.

In the following step S51, the buffer synchronization and, subsequently, the buffer service program GetFromBufPntr, are ended S52.

When the query in step S49 shows that the data stored in the buffer section are not valid, then the program execution switches to step S53 with which the buffer synchronization is ended. In the following step S54, a wait program is implemented. Since the buffer synchronization had ended in the preceding step S53, the producer program section can write data in the buffer or enable data for reading during the execution of the wait program, permitting data that can be read by the read program section to be generated in the buffer during the wait program. This wait program works just like that of the buffer service program GetToBufPntr; however, the wait program waits for the enable of a buffer section by the buffer service program ReleaseFromBufPntr.

After the end of the wait program, the program run returns to the step S46 with which this buffer service program is restarted. The execution is the same as described above. The read pointer points to the data that has been written in first that, accordingly, are read out first (a FIFO buffer).

With the buffer service program GetFromBufPntr, the read program section queries the parameters needed for reading the data, such as the read pointer, the size of the buffer section, and the data type. The read program section can read the data from the buffer on the basis of these parameters.

RELEASEFROMBUFPNTR—FIRST EMBODIMENT (FIG. 9)

The read operation is ended by the read program section by calling the buffer service program ReleaseFromBufPntr (FIG. 9). The buffer service program starts in step S55 and begins the buffer synchronization subsequently in step S56. In step S57, the flag of the most recently described buffer section is set to "invalid", i.e., indicating that the buffer section is enabled for being written by the producer program section.

The read pointer is updated in step S58, i.e., the amount of the quantity of data read is added to the address of the previous read pointer. The read pointer thus points to the first address of the next buffer section that has not yet been read.

The buffer synchronization is ended in step S59, and the buffer service program ReleaseFromBufPntr is ended in step S60.

FIGS. 11a, b and 12 show flowcharts of the two buffer service program GetFromBufPntr and ReleaseFromBufPntr that allow the reading of the data in blocks whose length is variable and deviates from the length of the buffer sections.

GETFROMBUFPNTR—SECOND EMBODIMENT (FIG. 11)

The buffer service program GetFromBufPntr starts with the step S61 and begins the buffer synchronization in step S62. In step S63, the read program section reads in the parameters of a relative position. A query is made in the following step S64 as to whether the data of the buffer section (to which the read pointer points) are valid and whether the end of the buffer has been reached. When both apply, the program run switches to the step S65 with which the program pointer is set to the physical start of the buffer. Subsequently, the program run switches to step S66.

When, in contrast, the query in step S64 shows that either the data are invalid or the end of the buffer has been reached, then the program runs switches directly to the step S66.

A query is made in step S66 as to whether the data are valid and whether the relative position is greater than or equal to this buffer section. The relative position is a relative address or a branch address that specifies the address branch from the read pointer to the beginning of the area to be read out. This relative address corresponds to a quantity of data that can be stored in this address area. In step S66, this quantity of data is compared to the quantity of data of the buffer section. When the query in step S66 shows that the data are valid and the relative position is greater than or equal to the buffer section, then this means that the read operation has crossed the boundary from one to another buffer section and that data of another buffer section are to be read out. Since the flag of this further buffer section has not yet been checked, the read pointer is set to the start of the next buffer section and the relative position is adapted S67, and the buffer synchronization ended S68. The program run then returns from step S68 to step S62, so that the above-explained method steps are performed again and the data of the further buffer section are checked for validity.

When the query in step S66 shows that the data are not valid or that the relative position is smaller than the size of the buffer section, then the program run switches to step S69 in which the validity of the data is checked anew. When the data are not valid, then the program run switches to the steps S70 and S71 with which the buffer synchronization is ended and a wait program is implemented that waits for the enable of the buffer section by the buffer service program Release- ToBufPntr. The steps S69 through S71 correspond to the steps S43, S53, S54 of the first embodiment of the buffer service program GetFromBufPntr.

When the query in step S69 shows that the data are valid, then the program run switches to step S72 in which a query is made as to whether the data quantity of the data block to be read out is greater in size than the buffer section. When the query in step S72 shows that the data quantity of the data block to be read out is not greater than the buffer section to be read out, then the program run switches to the step S73 with which the parameters of the size of the data block to be read out and the data type are output to the read program section. Subsequently, the buffer synchronization is ended in step S74, and the buffer service program GetFromBufPntr is ended in step S75.

When the query in step S72 shows that the data block to be read out is larger than the buffer section, then this means that data of a buffer section and data of a further buffer section are to be read out with a single data block. A query is therefore made in step S76 as to whether the data of the next buffer section are valid. When the query shows that the data are not valid, then the program run switches to the step S77 with which a query is made as to whether the end of the buffer has been reached. When the end of the buffer has not yet been reached, then the data can be immediately read out and the program run switches to the step S73. Otherwise, the program run switches to the step S78 with which a check is carried out to see whether the data at the start of the buffer are valid. When these data are not valid, then the program run returns to the step S70 that leads to the queue in step S71. Otherwise, the program run switches to the step S79 with which the data from the start of the buffer are copied into the last inherently empty buffer section that forms the end of the buffer and is marked as "end of buffer".

As a result, a complete data block can be read out proceeding beyond the end of the last buffer, for which reason the program run returns to step S73 with which the corresponding parameters are output to the read program section.

After the execution of GetFromBufPntr, the read program section can read a block from the buffer.

RELEASEFROMBUFPNTR—SECOND EMBODIMENT
(FIG. 12)

After reading a block, the buffer service program ReleaseFromBufPntr (FIG. 12) is called. This buffer service program begins in step S80 and starts the buffer synchronization in step S81. In step S82, the read program section reads the parameters of the relative position and size of the read data block in. Subsequently, a query is made S83 as to whether the relative position plus the size of the block that has been read in are greater than the buffer section. When this is the case, then this means that an entire buffer section has been read. The program runs then branches to the step S84 in which the flag of the buffer section that has been read is set to "invalid".

In the following step S85, the read pointer and the relative position are updated, where the first address of the buffer section following the buffer section that has been read is inserted into the read pointer, and the difference between the address following the buffer section read out from the buffer and the new read pointer is stored as a relative position. The sum of the new read pointer and the relative position thus indicate the first address of the memory area in the buffer that follows the buffer section that has been read out.

The buffer synchronization is ended in step S86 and the buffer service program is ended in step S87.

When the query in step S83 shows that the sum of the relative position and the size of the block that has been read is smaller than or equal to the buffer section, then this means that the buffer section from which the block has been read has not yet been completely read out. Thus, the flag of the buffer section can not yet be set to "invalid", because this would result in the buffer section being enabled for further writing and could no longer be completely read out.

Figure 11B:
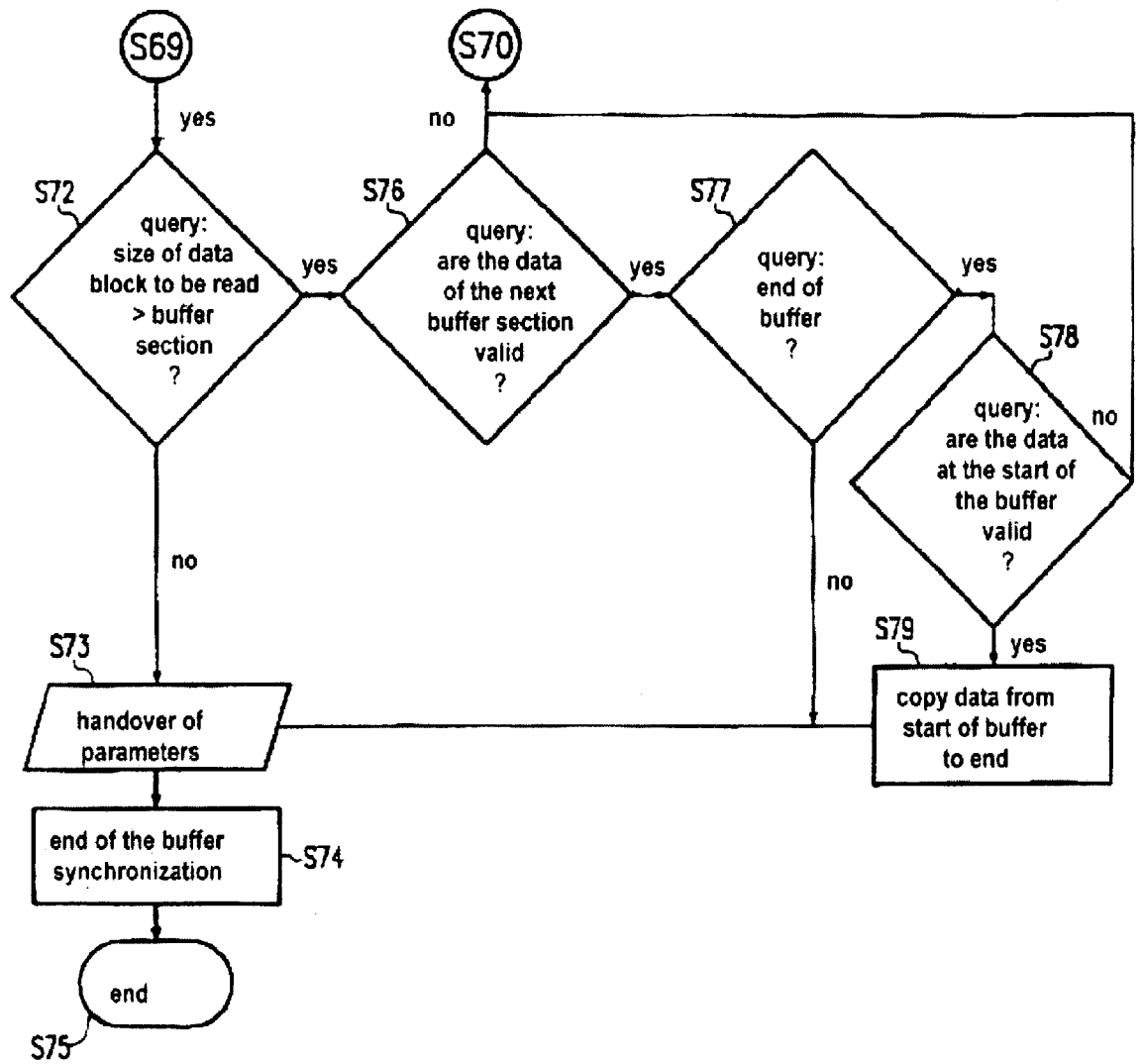

Data blocks whose size differs from the stored buffer sections can be read out with the buffer service programs shown in FIGS. 11a, 11b and in FIG. 12. This is shown by way of example in FIG. 4. FIG. 4 shows a buffer with a total of six buffer section PA1 through PA6. In the present exemplary embodiment, all buffer sections have the same size. However, it is also possible that the individual buffer sections have different sizes. The producer program section has written data units N, N+1, N+2 and N+3 into the buffer sections PA4, PA5, PA1 and PA2. Accordingly, the flags of these buffer sections PA4, PA5, PA1 and PA2 have been set to valid. The buffer section PA3 contains no data provided for reading, for which reasons its flag is set to "invalid".

The buffer section PA6 initially contains no data and is marked with an "end of buffer", i.e., that this represents the physical end of the buffer.

At the beginning of the read operation by the read program section, the read pointer resides at the first address of the buffer section PA4 that contains the first data that were written.

FIG. 4 shows that the read program section reads out data by way of four blocks X, X+1, X+2 and X+3. These blocks are smaller than the buffer sections. After reading out blocks X and X+1, data are copied from the buffer section PA1 into the buffer section PA6 so that a continuous quantity of data can be read at the next reading of the block X+2 when the boundary between the buffer sections PA5 and PA6 is crossed. This copying of the data from PA1 onto PA6 is implemented in step S79 of the buffer service program GetFromBufPntr (FIG. 11b). When the block X+2 has been read, then it is found that the read pointer points S64 to the physical end of the buffer, for which reason the read pointer is set S65 to the start of the buffer. The relative position assures that only those data are read from the buffer section PA1 that have not already been read from the buffer section PA6 by the block X+2.

The above exemplary embodiment shows blocks that are smaller than the buffer sections. Fundamentally, however, it is also possible to read out blocks that are larger than the buffer sections. In the above exemplary embodiment, the blocks can have twice the size of the buffer sections.

One can easily see on the basis of the above-explained exemplary embodiments that the control of the data transfer between two program sections is implemented solely by the synchronization buffer class, i.e., the buffer, the administrative data allocated to the buffer such as the flag, and the buffer service programs. In order to assure an error-free data transfer for writing and reading, the program sections merely have to call the buffer service programs with which the parameters needed for the reading and writing are handed over to the program sections and that prevent an illegal access to the buffers.

Figure 2:
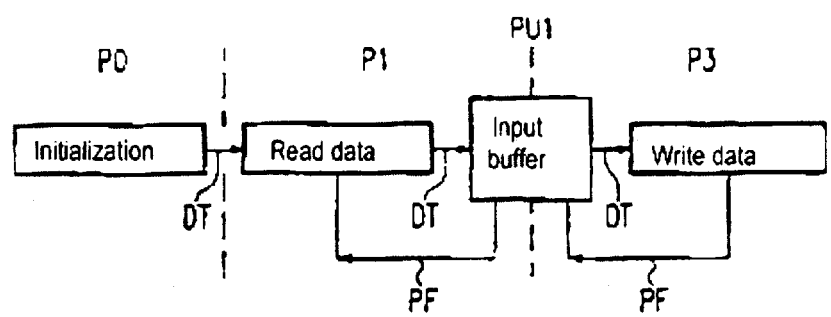
FIG. 2 is a schematic block circuit diagram showing the operation of the computer program from FIG. 1 in which a program section is omitted.

Another advantage of the inventive method is that, due to the separate data interface between each buffer and the program section, the entire computer program can be quickly restructured in that a program section merely writes the data into a different buffer or reads them from a different buffer. This can be simply and quickly implemented by modifying a corresponding class pointer. FIG. 2 shows such a modification in which the program section processing the data has simply been removed in that the program section "write data" P3 reads its data directly from the input buffer. This is implemented simply by modifying the pointer of the program section "write data" P3 to the input buffer.

The invention has been explained in greater detail above on the basis of exemplary embodiments in which a respective buffer is arranged between two program sections and by which a respective producer program section can write data into the buffer and a read program section can read data from the buffer. In the scope of the invention, however, it is possible that, for example, a plurality of program sections write into a buffer or read from a buffer. To this end, the individual buffer service programs must simply be modified to prevent the program sections from simultaneously accessing the buffer. As warranted, it can be expedient to indicate which data are provided for which program section with the flag.

The inventive method is provided for the synchronization of program sections that can run parallel on the individual processors given a computer with a plurality of processors. Of course, the inventive method can also be implemented on a computer with a single processor.

The invention has been explained above on the basis of an exemplary embodiment in which data can be reserved. In the scope of the invention, it is also possible that the flag can be set only to the two statuses "valid" or "invalid". The buffer service program SetResBufState is eliminated in such a simplified embodiment.

A corresponding initialization program is provided for initializing the buffer. This initialization program defines the memory area that the buffer makes use of. It can be set as needed. Accordingly, the plurality of buffer sections can vary; in particular, the length of the individual buffer sections can be different.

The inventive method can be realized as a component part of an operating system of a computer. In this configuration, the inventive method can be fashioned as a computer program that can be stored on a data carrier or transmitted via a data network. In particular, the buffer device can be implemented as a memory module. However, it is also possible to provide a buffer device with a hardware circuit, for example, an application-specific integrated circuit (ASIC) with correspondingly integrated buffer memories that implements the inventive method.

FIGS. 13 and 14 show, in a simplified manner, a computer Co with an operating system BS within which the inventive method is integrated. The computer comprises either a single processor (CPU in FIG. 13) or two processors (CPU1 and CPU2 in FIG. 14). The computers respectively have a permanent memory P-Sp and a main memory RAM. The permanent memory P-Sp is represented, for example, by a hard disk drive, a diskette drive and/or a ROM memory. Typically, the main memory RAM is a semiconductor memory. The processor or processors in the illustrated exemplary embodiments communicate with the permanent memory P-Sp and the main memory RAM via a data bus B.

Before one of the two computers is started, the operating system BS and the complete computer program Co-Pr are stored in the permanent memory P-Sp. When the computer Co is started and the computer program Co-Pr is called by a user, the parts of the operating system BS and of the computer program Co-Pr needed for implementation are loaded into the main memory RAM which the processor CPU or processors CPU1, CPU2 access for execution.

The operating system comprises buffer programs Pu-Pr such as an initialization program and the buffer service programs. The initialization program is called, for example, after the computer is started, as a result of which a section for the buffer Pu is reserved in the main memory. In the illustrated embodiment, the buffer Pu is arranged in the region of the operating system BS. However, it is also possible to form the buffer in a memory section of the main memory that is independent of the operating system BS.

Given the computer Co according to FIG. 13 comprising a single processor CPUr, all program sections are executed on the single processor CPU. Given the computer Co according to FIG. 14 comprising two processors CPU1, CPU2, the program sections are distributed onto the two processors, i.e., some of the program sections are executed on one processor and the rest are executed on the other processor. This division onto different processors ensues automatically via the operating system BS.

The software (operating system BS and computer program Co-Pr) of the two computers shown in FIGS. 13 and 14 is identical. The operating system recognizes the plurality of processors according to FIG. 14 and then automatically implements this division.

Windows NT and multi-processor versions of UNIX are suitable operating systems into which the inventive method can be integrated or under which program sections for the implementation of the inventive method can run.

In summary, the invention can be presented again as follows: a method for the synchronization of program sections (P0, P1, P3) of a computer program (Co-Pr), where the computer program (Co-Pr) is divided into the program sections (P0-P3) such that these can run parallel on different processors (CPU, CPU1, CPU2) of a computer (Co). Producer program sections (P1, P2) generate the data for another program section and respectively write these into a buffer (PU). Read program sections (P2, P3), which read the data from a producer program section (P1, P2), read data out from a buffer (Pu); and buffer sections (PA1-PA6) are respectively provided with a flag with which respective write and read operations of the corresponding buffer sections (PA1-PA6) can be controlled, by which the flags are set by buffer service programs (S5, S7, S14). Although the program sections are mainly implemented as threads in the above-described exemplary embodiments, these program sections can also be converted by other parts of software or firmware programs.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

List of Reference Characters

| | |
|---|---|
| P0 . . . P3 | program sections |
| PU1, PU2 | buffers |
| DT | data transfer |
| PF | arrow |
| PA1 . . . PA6 | buffer sections |
| P-Sp | permanent memory |
| RAM | main memory |
| B | data bus |
| CPU | processor |
| CPU1 | processor |
| CPU2 | processor |
| Co-Pr | computer program |
| Bs | operating system |
| Pu-Pr | buffer programs |
| PU | buffer |

Method Steps

| | |
|---|---|
| S1 | start |
| S2 | part of a program execution |
| S3 | GetToBufPntr |
| S4 | write data into the buffer |
| S5 | ReleaseToBufPntr |
| S6 | part of a program execution |
| S7 | SetResBufState |
| S8 | part of a program execution |
| S9 | end |
| S10 | start |
| S11 | part of a program execution |
| S12 | GetFromBufPntr |
| S131 | read data from buffer |
| S14 | ReleaseFromBufPntr |
| S15 | part of a program execution |
| S16 | end |
| S17 | start |
| S18 | beginning of the buffer synchronization |
| S19 | parameter transfer |
| S20 | query: is a buffer section available for writing? |
| S21 | calculate the size of the available memory location |
| S22 | query: available memory location >= requested memory space |
| S23 | output of parameters |
| S24 | end of the buffer synchronization |
| S25 | end |
| S26 | query: end of buffer? |
| S27 | go to start of buffer |
| S28 | end of the buffer synchronization |
| S29 | end of the buffer synchronization |
| S30 | wait program |
| S31 | start |
| S32 | start of the buffer synchronization |
| S33 | read parameters in |
| S34 | set flag (valid/reserved) |
| S35 | memory data type |
| S36 | update write pointer |
| S37 | end of buffer synchronization |
| S38 | end |
| S39 | start |
| S40 | beginning of the buffer synchronization |
| S41 | read parameters in |
| S42 | set flag (valid/invalid) |
| S43 | end of the buffer synchronization |
| S44 | end |
| S45 | start |
| S46 | beginning of the buffer synchronization |
| S47 | query: end of buffer? |
| S48 | go to start of buffer |
| S49 | query: data valid? |
| S50 | output parameters |
| S51 | end of the buffer synchronization |
| S52 | end |
| S53 | end of the buffer synchronization |
| S54 | wait program |
| S55 | start |
| S56 | beginning of the buffer synchronization |
| S57 | set flag to "invalid" |
| S58 | update read pointer |
| S59 | end of the buffer synchronization |
| S60 | end |
| S61 | start |
| S62 | beginning of the buffer synchronization |
| S63 | read parameters in |
| S64 | query: data valid and end of buffer? |
| S65 | go to start of buffer |
| S66 | data valid & relative position >= buffer section? |
| S67 | update write pointer |
| S68 | end of the buffer synchronization |
| S69 | query: data valid? |
| S70 | end of the buffer synchronization |
| S71 | wait program |
| S72 | query: size of data block to be read out > buffer section? |
| S73 | handover of parameters |
| S74 | end of the buffer synchronization |
| S75 | end |
| S76 | query: are the data of the next buffer section valid? |
| S77 | query: end of buffer? |
| S78 | query: are the data at the start of the buffer valid? |
| S79 | copy data from the start of the buffer to the end |
| S80 | start |
| S81 | beginning of the buffer synchronization |
| S82 | read parameters in |
| S83 | query: relative position and block size > buffer section? |
| S84 | set flag to "invalid" |
| S85 | update read pointer and relative position |
| S86 | end of the buffer synchronization |
| S87 | end |

The invention claimed is:

1. An operating system for a computer, comprising:
   a buffer class comprising a buffer and buffer service programs; and
   threads that are synchronized by the buffer class using a plurality of processors comprising algorithms for:
   running the threads of the computer program in parallel on one or more processors of computers in a computer network;
   generating data by a producer thread for a different thread;
   writing the data produced by the producer thread into buffer sections of a buffer in a write operation;

reading the data generated by the producer thread by a read thread from the buffer in a read operation;
controlling the write operations of the producer threads and the read operations of the read threads with buffer section flags that are set by buffer service programs;
controlling the write operations and the read operations of a corresponding buffer section with a buffer section flag of the buffer section;
preventing a simultaneous access to the buffer section flags for a second buffer service program during an access of a first buffer service program of the buffer by way of a standard function of the operating system employed;
storing information related to a size of a buffer section along with its buffer section flags permitting individual buffer sections to have different sizes;
performing a pointer query for information related to a buffer section by a buffer service program;
outputting, by at least one of the buffer service programs, a read pointer or a write pointer to the respective thread in response to a corresponding pointer query, wherein the read pointer is related to an address of a start of the readable buffer section and the write pointer is related to an address of a start of the writable buffer section;
processing a query about a specific size of the buffer section available for the writing or for the reading; and
while a buffer section having the necessary size is not available, repeatedly performing the following:
executing a wait procedure; and
rechecking whether a buffer section having the necessary size is available.

2. A computer, comprising:
a plurality of processors; and
an operating system running on one or more of the processors for a computer, comprising:
a buffer class comprising a buffer and buffer service programs; and
threads that are synchronized by the buffer class using a plurality of processors comprising algorithms for:
running the threads of the computer program in parallel on one or more processors of computers in a computer network;
generating data by a producer thread for a different thread,
writing the data produced by the producer thread into buffer sections of a buffer in a write operation;
reading the data generated by the producer thread by a read thread from the buffer in a read operation;
controlling the write operations of the producer threads and the read operations of the read threads with buffer section flags that are set by buffer service programs;
controlling the write operations and the read operations of a corresponding buffer section with a buffer section flag of the buffer section;
preventing a simultaneous access to the buffer section flags for a second buffer service program during an access of a first buffer service program of the buffer by way of a standard function of the operating system employed;
storing information related to a size of a buffer section along with its buffer section flag, permitting individual buffer sections to have different sizes;
performing a pointer query for information related to a buffer section by a buffer service program;
outputting, by at least one of the buffer service programs, a read pointer or a write pointer to the respective thread in response to a corresponding pointer query, wherein the read pointer is related to an address of a start of the readable buffer section and the write pointer is related to an address of a start of the writable buffer section;
processing a query about a specific size of the buffer section, available for the writing or for the reading; and
while a buffer section having the necessary size is not available repeatedly performing the following:
executing a wait procedure; and
rechecking whether a buffer section having the necessary size is available.

3. An apparatus, performing the steps comprising:
running the threads of the computer program in parallel on one or more processors of computers in a computer network;
generating data by a producer thread for a different thread;
writing the data produced by the producer thread into buffer sections of a buffer in a write operation;
reading the data generated by the producer thread by a read thread from the buffer in a read operation;
controlling the write operations of the producer threads and the read operations of the read threads with buffer section flags that are set by buffer service programs;
controlling the write operations and the read operations of a corresponding buffer section with a buffer section flag of the buffer section;
preventing a simultaneous access to the buffer section flags for a second buffer service program during an access of a first buffer service program of the buffer by way of a standard function of the operating system employed;
storing information related to a size of a buffer section along with its buffer section flag, permitting individual buffer sections to have different sizes;
performing a pointer query for information related to a buffer section by a buffer service program;
outputting, by at least one of the buffer service programs, a read pointer or a write pointer to the respective thread in response to a corresponding pointer query, wherein the read pointer is related to an address of a start of the readable buffer section and the write pointer is related to an address of a start of the writable buffer section;
processing a query about a specific size of the buffer section available for the writing or for the reading; and
while a buffer section having the necessary size is not available, repeatedly performing the following:
executing a wait procedure; and
rechecking whether a buffer section having the necessary size is available.

4. A computer program, stored in a computer storage medium, when executed by a computer, would perform the steps comprising
running the threads of the computer program in parallel on one or more processors of computers in a computer network;
generating data by a producer thread for a different thread;
writing the data produced by the producer thread into buffer sections of a buffer in a write operation;
reading the data generated by the producer thread by a read thread from the buffer in a read operation;
controlling the write operations of the producer threads and the read operations of the read threads with buffer section flags that are set by buffer service programs;

controlling the write operations and the read operations of a corresponding buffer section with a buffer section flag of the buffer section;

preventing a simultaneous access to the buffer section flags for a second buffer service program during an access of a first buffer service program of the buffer by way of a standard function of the operating system employed;

storing information related to a size of a buffer section along with its buffer section flag, permitting individual buffer sections to have different sizes;

performing a pointer query for information related to a buffer section by a buffer service program;

outputting, by at least one of the buffer service programs, a read pointer or a write pointer to the respective thread in response to a corresponding pointer query, wherein the read pointer is related to an address of a start of the readable buffer section and the write pointer is related to an address of a start of the writable buffer section;

processing a query about a specific size of the buffer section available for the writing or for the reading; and while a buffer section having the necessary size is not available, repeatedly performing the following:
executing a wait procedure; and
rechecking whether a buffer section having the necessary size is available.

5. A method for synchronizing threads of a computer program, comprising:

running the threads of the computer program in parallel on one or more processors of computers in a computer network;

generating data by a producer thread for a different thread;

writing the data produced by the producer thread into buffer sections of a buffer in a write operation;

reading the data generated by the producer thread by a read thread from the buffer in a read operation;

controlling the write operations of the producer threads and the read operations of the read threads with buffer section flags that are set by buffer service programs;

controlling the write operations and the read operations of a corresponding buffer section with a buffer section flag of the buffer section;

preventing a simultaneous access to the buffer section flags for a second buffer service program during an access of a first buffer service program of the buffer by way of a standard function of the operating system employed;

storing information related to a size of a buffer section along with its buffer section flag, permitting individual buffer sections to have different sizes;

performing a pointer query for information related to a buffer section by a buffer service program;

outputting, by at least one of the buffer service programs, a read pointer or a write pointer to the respective thread in response to a corresponding pointer query, wherein the read pointer is related to an address of a start of the readable buffer section and the write pointer is related to an address of a start of the writable buffer section;

processing a query about a specific size of the buffer section available for the writing or for the reading; and while a buffer section having the necessary size is not available, repeatedly performing the following:
executing a wait procedure; and
rechecking whether a buffer section having the necessary size is available.

6. The method according to claim 5, further comprising:
providing a common buffer for two threads;
writing, by one of the two threads, data in blocks of a first size into the common buffer; and
reading, by an other of two threads, data from the common buffer in blocks of a different, second size.

7. The method according to claim 5, further comprising:
reading a data block that is larger than a buffer section from different buffer sections.

8. The method according to claim 5, further comprising:
indicating, with at least two statuses for the buffer section flag, whether data can be written into the buffer section or can be read from the buffer section.

9. The method according to claim 8, further comprising:
indicating, with the buffer section flag, that the data written into the buffer section have not yet been enabled for reading.

10. The method according to claim 5, wherein the data that are written into the buffer first are in turn read out first.

11. The method according to claim 5, further comprising:
storing information related to a type of data stored in the respective buffer section together with the buffer section flags.

12. The method according to claim 5, further comprising:
outputting a value related to memory area available for the writing or for the reading in response to the pointer query.

13. The method according to claim 5, further comprising:
putting a corresponding buffer service program to sleep by the wait program; and
awakening the buffer service program by a signal generated by another buffer service program.

14. The method according to claim 5, wherein access of the buffer sections and the appertaining memory sections are enabled during the execution of the wait procedure, so that a thread that did not direct the query to the buffer can access it.

15. The method according to claim 5, further comprising:
copying data to the end of a memory area by a buffer service program when that buffer service program processing a query for a read pointer determines that data that reside at the start of the memory area are required at the end of a memory area allocated to the buffer as data memory.

16. The method according to claim 5, further comprising:
calling, by a thread, after reading or writing of data by the respective thread, a buffer service program that sets a read or write pointer to a current value and correspondingly sets a flag of a most recently read or written buffer section.

17. The method according to claim 5, wherein the threads are executed on different processors of one or more computers.

18. The method for synchronizing threads of a computer program according to claim 5, wherein the buffer status flag is a status variable that assumes three states, the states comprising, invalid, valid, and reserved.

19. The method according to claim 5, wherein the buffer sections comprise differing sizes.

20. The method according to claim 5, further comprising storing the buffer section flags in a memory section that is independent of the buffer sections containing the data.

21. The method according to claim 5, further comprising successively storing the buffer sections containing the data.

22. The method according to claim 5, wherein the standard function of the operating system is a global locking mechanism.

23. The method according to claim 22, wherein the global locking mechanism is a semaphore or a mutex.

24. A computer storage medium that comprises:
a computer program or operating system that comprises algorithms for:
  running the threads of the computer program in parallel on one or more processors of computers in a computer network;
  generating data by a producer thread for a different thread;
  writing the data produced by the producer thread into buffer sections of a buffer in a write operation;
  reading the data generated by the producer thread by a read thread from the buffer in a read operation;
  controlling the write operations of the producer threads and the read operations of the read threads with buffer section flags that are set by buffer service programs;
  controlling the write operations and the read operations of a corresponding buffer section with a buffer section flag of the buffer section;
  preventing a simultaneous access to the buffer section flags for a second buffer service program during an access of a first buffer service program of the buffer by way of a standard function of the operating system employed;
  storing information related to a size of a buffer section along with its buffer section flag, permitting individual buffer sections to have different sizes;
  performing a pointer query for information related to a buffer section by a buffer service program;
  outputting, by at least one of the buffer service programs, a read pointer or a write pointer to the respective thread in response to a corresponding pointer query, wherein the read pointer is related to an address of a start of the readable buffer section and the write pointer is related to an address of a start of the writable buffer section;
  processing a query about a specific size of the buffer section available for the writing or for the reading; and
  while a buffer section having the necessary size is not available, repeatedly performing the following:
  executing a wait procedure; and
  rechecking whether a buffer section having the necessary size is available.

* * * * *